(12) United States Patent
Idan et al.

(10) Patent No.: US 10,829,281 B2
(45) Date of Patent: Nov. 10, 2020

(54) FLEXIBLE PACKAGING MATERIAL

(71) Applicant: HP Indigo B.V., Amstelveen (NL)

(72) Inventors: David Idan, Nes Ziona (IL); Raia Slivniak, Lod (IL)

(73) Assignee: HP Indigo B.V., Amstelveen (NL)

(*) Notice: Subject to any disclaimer, the term of this patent is extended or adjusted under 35 U.S.C. 154(b) by 162 days.

(21) Appl. No.: 15/755,015

(22) PCT Filed: Oct. 28, 2015

(86) PCT No.: PCT/EP2015/075028
§ 371 (c)(1),
(2) Date: Feb. 23, 2018

(87) PCT Pub. No.: WO2017/071750
PCT Pub. Date: May 4, 2017

(65) Prior Publication Data
US 2019/0218007 A1    Jul. 18, 2019

(51) Int. Cl.
*B65D 65/02* (2006.01)
*B32B 37/04* (2006.01)
(Continued)

(52) U.S. Cl.
CPC ............... *B65D 65/02* (2013.01); *B32B 7/04* (2013.01); *B32B 7/12* (2013.01); *B32B 15/043* (2013.01);
(Continued)

(58) Field of Classification Search
CPC ......... B32B 27/16; B32B 29/02; B32B 33/00; Y10T 428/31855; Y10T 428/31938
(Continued)

(56) References Cited

U.S. PATENT DOCUMENTS

| 5,670,448 A | 9/1997 | Kometani |
| 7,281,360 B1 | 10/2007 | Larimore et al. |
| (Continued) | | |

FOREIGN PATENT DOCUMENTS

| EP | 1818171 | 8/2007 |
| JP | 2000085049 | 3/2000 |
| (Continued) | | |

OTHER PUBLICATIONS

Warren E Durling: "2009 Consumer packaging solutions for barrier performance course—Flexible Packaging Printing Processing Overview".

(Continued)

*Primary Examiner* — Betelhem Shewareged
(74) *Attorney, Agent, or Firm* — Dierker & Kavanaugh PC

(57) ABSTRACT

A process for preparing a flexible packaging material (5) is described. The process comprising providing a first flexible substrate (3) having a first surface on which an ink composition (4) is printed, the printed ink composition comprising an ink resin comprising polyvinyl chloride, polyvinyl butyral, nitrocellulose, polyurethane, polyamide or a UV curable resin; providing a second flexible substrate (1); depositing a layer of thermally activatable laminating material (2) onto one of a first surface of the second flexible substrate and the first surface of the first flexible substrate on which the ink composition is printed, the thermally activatable laminating material comprising a thermally activatable polymer selected from a copolymer of an alkylene monomer and an acrylic acid or methacrylic acid monomer, a copolymer of an alkylene monomer and an alkyl acrylate or alkyl methacrylate monomer, a polyurethane, an ionomer, a copolymer of alkylene monomers, a maleic anhydride modified polyalkylene and an acid modified polyolefin; and contact- (Continued)

ing under conditions of heat and/or pressure the layer of thermally activatable laminating material with the other of the second flexible substrate and the first surface of the first flexible substrate on which the ink composition is printed.

13 Claims, 2 Drawing Sheets

(51) Int. Cl.
| | |
|---|---|
| B32B 7/12 | (2006.01) |
| B32B 15/04 | (2006.01) |
| B32B 15/082 | (2006.01) |
| B32B 15/085 | (2006.01) |
| B32B 15/088 | (2006.01) |
| B32B 15/09 | (2006.01) |
| B32B 15/12 | (2006.01) |
| B32B 15/20 | (2006.01) |
| B32B 27/08 | (2006.01) |
| B32B 27/10 | (2006.01) |
| B32B 27/30 | (2006.01) |
| B32B 27/32 | (2006.01) |
| B32B 27/34 | (2006.01) |
| B32B 27/36 | (2006.01) |
| B32B 29/00 | (2006.01) |
| B32B 27/00 | (2006.01) |
| B65D 65/00 | (2006.01) |
| B32B 7/04 | (2019.01) |
| B32B 38/00 | (2006.01) |

(52) U.S. Cl.
CPC .......... *B32B 15/082* (2013.01); *B32B 15/085* (2013.01); *B32B 15/088* (2013.01); *B32B 15/09* (2013.01); *B32B 15/12* (2013.01); *B32B 15/20* (2013.01); *B32B 27/00* (2013.01); *B32B 27/08* (2013.01); *B32B 27/10* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 29/005* (2013.01); *B32B 37/04* (2013.01); *B65D 65/00* (2013.01); *B32B 38/145* (2013.01); *B32B 2250/02* (2013.01); *B32B 2250/03* (2013.01); *B32B 2250/04* (2013.01); *B32B 2250/24* (2013.01); *B32B 2250/242* (2013.01); *B32B 2250/244* (2013.01); *B32B 2255/06* (2013.01); *B32B 2255/10* (2013.01); *B32B 2255/12* (2013.01); *B32B 2255/20* (2013.01); *B32B 2255/205* (2013.01); *B32B 2255/26* (2013.01); *B32B 2307/31* (2013.01); *B32B 2307/412* (2013.01); *B32B 2307/518* (2013.01); *B32B 2307/7244* (2013.01); *B32B 2307/7246* (2013.01); *B32B 2307/732* (2013.01); *B32B 2307/748* (2013.01); *B32B 2307/75* (2013.01); *B32B 2309/02* (2013.01); *B32B 2439/70* (2013.01); *B32B 2553/00* (2013.01); *Y10T 428/31855* (2015.04); *Y10T 428/31938* (2015.04)

(58) Field of Classification Search
USPC .......................................................... 428/201
See application file for complete search history.

(56) References Cited

U.S. PATENT DOCUMENTS

| | | | |
|---|---|---|---|
| 7,520,959 | B2 | 4/2009 | Kikuchi |
| 7,521,173 | B2 | 4/2009 | Dontula et al. |
| 7,727,634 | B2 | 6/2010 | Yacovone |
| 7,854,987 | B2 | 12/2010 | Jaipuria |
| 8,247,063 | B2 | 8/2012 | Holbert |
| 8,356,459 | B1 | 1/2013 | Larimore et al. |
| 8,377,846 | B2 | 2/2013 | Dontula et al. |
| 8,440,740 | B2 | 5/2013 | Blackwell et al. |
| 9,102,125 | B2 | 8/2015 | Battersby et al. |
| 10,213,950 | B2 * | 2/2019 | Salant ................ B32B 7/12 |
| 2011/0003096 | A1 * | 1/2011 | Holbert ............... B32B 7/06 |
| | | | 428/32.11 |
| 2012/0040113 | A1 * | 2/2012 | Sato ................ G09F 3/0297 |
| | | | 428/34.1 |
| 2013/0224305 | A1 | 8/2013 | Garrity et al. |
| 2014/0370252 | A1 | 12/2014 | Regnier |
| 2019/0218007 | A1 * | 7/2019 | Idan ..................... B32B 7/04 |

FOREIGN PATENT DOCUMENTS

| | | |
|---|---|---|
| JP | 2000508261 | 7/2000 |
| JP | 2001171034 | 6/2001 |
| JP | 2001191411 | 7/2001 |
| JP | 2007021963 | 2/2007 |
| JP | 2011006133 | 1/2011 |
| JP | 2013071370 | 4/2013 |
| WO | WO-0140395 | 6/2001 |
| WO | WO-2007130069 | 11/2007 |
| WO | WO-2009142825 | 11/2009 |
| WO | WO-2012006156 | 1/2012 |
| WO | WO-2014044322 | 3/2014 |
| WO | WO-2014160631 | 10/2014 |
| WO | WO-2015069255 | 5/2015 |
| WO | WO-2016074716 | 5/2016 |
| WO | WO-2016074717 | 5/2016 |
| WO | WO-2016074718 | 5/2016 |

OTHER PUBLICATIONS

International Search Report and Written Opinion for International Application No. PCT/EP2015/075028, dated Aug. 11, 2016, 15 pages.

* cited by examiner

FLEXIBLE PACKAGING MATERIAL

BACKGROUND

All manner of consumer goods, for example, food products, beverages, chemicals, wet wipes etc., are packaged using films or sheets of flexible packaging material, with images such as corporate branding, or product information printed onto the film. The flexible packaging material serves to protect the product from, for example, moisture, oxidation, light, $CO_2$ or pathogens, while also providing information to the user regarding the nature and origin of the product contained therein.

DETAILED DESCRIPTION

Figure 1:
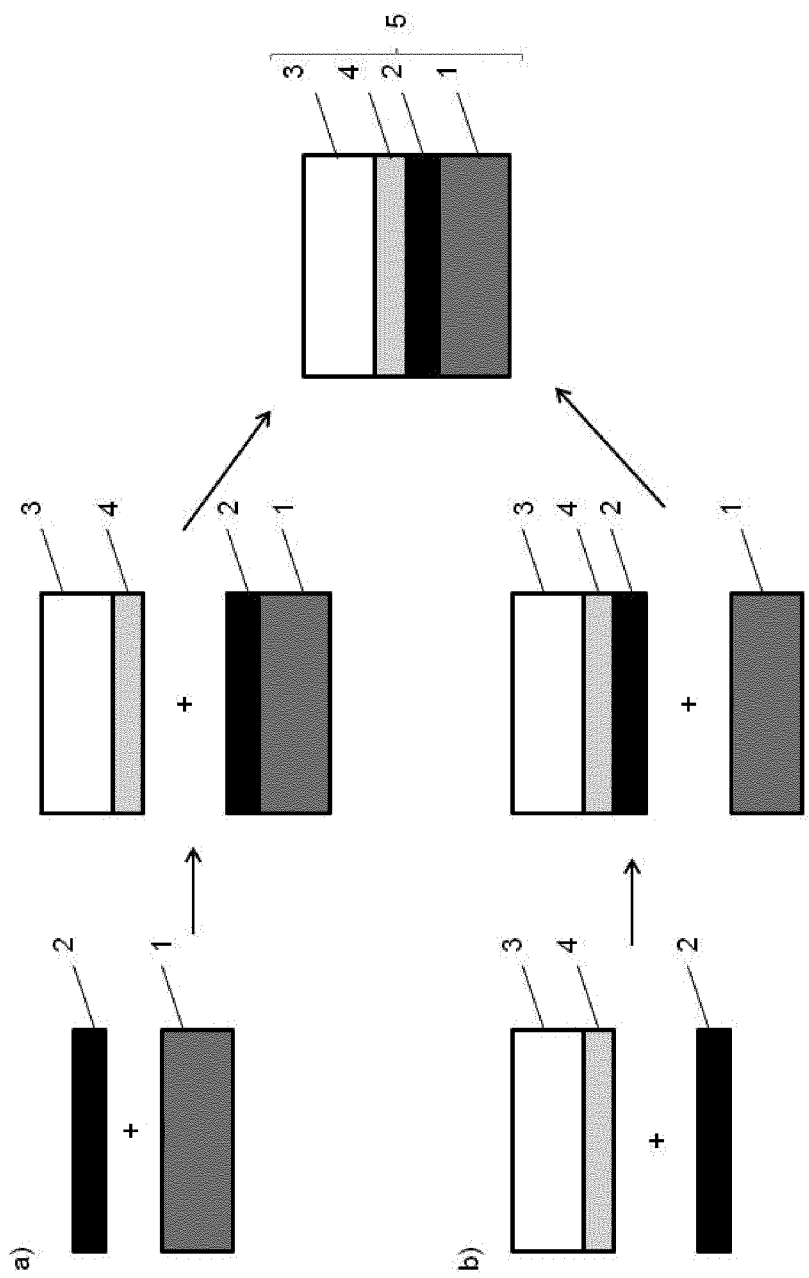
FIGS. 1a) and 1b) are schematic representations of processes for producing a flexible packaging material.

Before the present disclosure is disclosed and described, it is to be understood that this disclosure is not restricted to the particular process features and materials disclosed herein because such process features and materials may vary somewhat. It is also to be understood that the terminology used herein is used for the purpose of describing particular examples.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which ink particles, e.g. ink particles comprising an ink resin and/or a colorant can be dispersed to form an ink composition. The carrier liquids may include a mixture of a variety of different agents, such as surfactants, co-solvents, viscosity modifiers, and/or other possible ingredients.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not just pigment colorants, but other pigments such as organometallics, ferrites, ceramics, etc.

As used herein, "co-polymer" refers to a polymer that is polymerized from at least two monomers.

As used herein, "lamination bond strength" refers to the force (per length) required to delaminate a laminated material, and is expressed in units of Newton/inch, or N/in. The lamination bond strength can be measured according to standard techniques, in particular ASTM F0904-98R08. Unless otherwise stated, the lamination bond strength of a flexible packaging material described herein refers to the strength to delaminate the material at the interface between a thermally activatable laminating material and either of the two materials to which the thermally activatable laminating material has bonded.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components, e.g. any other components of the thermally activatable laminating material or ink composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the thermally activatable laminating material.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise. In some examples, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components, e.g. any other components of the thermally activatable laminating material or ink composition.

In some examples, the melting point of a resin or polymer described herein may be the melting point measured according to ASTM D3418.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, the term "about" is used to provide flexibility to a numerical range endpoint by providing that a given value may be a little above or a little below the endpoint to allow for variation in test methods or apparatus. The degree of flexibility of this term can be dictated by the particular variable.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, wt % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect there is provided a process for preparing a flexible packaging material. The process for preparing a flexible packaging material may comprise:
 providing a first flexible substrate having a first surface on which an ink composition is printed, the printed ink composition comprising an ink resin comprising polyvinyl chloride, polyvinyl butyral, nitrocellulose, polyurethane, polyamide, a UV curable resin, or combinations thereof;
 providing a second flexible substrate;
 depositing a layer of thermally activatable laminating material onto one of a first surface of the second flexible substrate and the first surface of the first flexible substrate on which the ink composition is printed, the thermally activatable laminating material comprising a thermally activatable polymer selected from a copolymers of an alkylene monomer and an acrylic acid or methacrylic acid monomer, a copolymer of an alkylene monomer and an alkyl acrylate or alkyl methacrylate monomer, a polyurethane, an ionomer, a copolymer of alkylene monomers, a maleic anhydride modified polyalkylene and an acid modified polyolefin; and
 contacting under conditions of heat and/or pressure the layer of thermally activatable laminating material with the other of the second flexible substrate and the first surface of the first flexible substrate on which the ink composition is printed.

In another aspect there is provided a flexible packaging material. The flexible packaging material may comprise:
 a first flexible substrate having a first surface;
 an ink composition printed on the first surface of the first flexible substrate, the printed ink composition comprising an ink resin comprising polyvinyl chloride, polyvinyl butyral, nitrocellulose, polyurethane, polyamide, a UV cured polymer, or combinations thereof;
 a second flexible substrate; and
 a layer of a thermally activated laminating material disposed between and bonded to the second flexible substrate and to the first surface of the first flexible substrate printed with the ink composition, the thermally activated laminating material comprising a thermally activated polymer selected from a copolymer of an alkylene monomer and an acrylic acid or methacrylic acid monomer, a copolymer of an alkylene monomer and an alkyl acrylate or alkyl methacrylate monomer, a polyurethane, an ionomer, a copolymer of alkylene monomers, a maleic anhydride modified polyalkylene and an acid modified polyolefin.

In another aspect there is provided a flexible package. The flexible package may comprise a flexible material comprising:
 a first flexible substrate having a first surface;
 an ink composition printed on the first surface of the first flexible substrate, the printed ink composition comprising an ink resin comprising polyvinyl chloride, polyvinyl butyral, nitrocellulose, polyurethane, polyamide, a UV cured polymer, or combinations thereof;
 a second flexible substrate; and
 a layer of a thermally activated laminating material disposed between and bonded to the second flexible substrate and to the first surface of the first flexible substrate printed with the ink composition, the thermally activated laminating material comprising a thermally activated polymer selected from a copolymer of an alkylene monomer and an acrylic acid or methacrylic acid monomer, a copolymer of an alkylene monomer and an alkyl acrylate or alkyl methacrylate monomer, a polyurethane, an ionomer, a copolymer of alkylene monomers, a maleic anhydride modified polyalkylene and an acid modified polyolefin.

Much research has been carried out in recent years to try to develop laminated flexible packaging materials comprising a functional (barrier) substrate laminated to a second substrate comprising a printed image or information. Many solvent based or even "solvent free" laminating adhesives require a prolonged period of curing, and so there is a lag time between a flexible packaging material being produced and the material being ready for packaging.

The present inventors have found that examples of the method as described herein avoid or at least mitigate at least one of the difficulties described above. They have found that examples of the method are more successful than previous methods in that the lamination and bonding is immediate such that no cure time is required. The methods described can be implemented in-line with a standard printing processes, thus further streamlining the process for producing flexible packaging materials.

Flexible Packaging Material

In some examples, a flexible packaging material is described. The flexible packaging material may be produced by any of the methods described herein. Each component of the flexible packaging material will be discussed in the sections which follow.

In some examples, the flexible packaging material comprises a laminate structure with sufficient bond strength to avoid delamination of the layers, in particular delamination at the interface between the layer of laminating material (which may be thermally activatable) and the surface of the print substrate comprising the ink composition printed image or information. In some examples, the lamination bond strength is measured directly after the flexible packaging material has cooled to room temperature following lamination. In some examples, the lamination bond strength is measured on a flexible packaging material that has not been subjected to any curing or rest period following lamination and cooling. In some examples, the lamination bond strength is measured immediately after lamination and cooling of the flexible packaging material.

In some examples, the flexible packaging material has a lamination bond strength as measured by ASTM F0904-98R08. In some examples, the flexible packaging material has a lamination bond strength of at least about 0.5 N/inch, for example at least about 1.0 N/inch, for example at least about 1.2 N/inch, for example at least about 1.5 N/inch, for example at least about 2.0 N/inch, for example at least about 2.5 N/inch, for example at least about 3.0 N/inch, for example at least about 4.0 N/inch, for example at least about 5.0 N/inch, for example at least about 6.0 N/inch, for example at least about 7.0 N/inch, for example at least about 8.0 N/inch, for example at least about 9.0 N/inch, for example about 10.0 N/inch, as measured by ASTM F0904-98R08.

First Flexible (Print) Substrate

The first flexible substrate, to which the ink composition is to be printed (and thus is also referred to herein as the print substrate) may be any material suitable for use in a printing process and suitable for use in a flexible packaging material.

In some examples, the first flexible substrate forms the outermost layer of the final, laminated flexible packaging material as prepared in the methods described herein, in some examples the first flexible substrate is transparent in order that the printed image or information is visible to the consumer.

In some examples, the first flexible substrate comprises an image or information printed on a first surface of the first flexible substrate in a printing process, for example a printing process using rotogravure or flexographic printing technologies, using an ink composition as described herein. In some examples, the image or information may be reverse printed onto the first surface of the first flexible substrate, with a second surface of the first flexible substrate forming the outermost surface of the flexible packaging material and the printed image or information appearing the right way round when viewed through the first flexible substrate. In this way, the printed image or information is embedded within the multi-layer structure of the flexible packaging material and not on the outermost surface, and thus protected from damage.

In some examples, the first flexible substrate comprises a film of a polymer, for example a thermoplastic polymer. In some examples the first flexible substrate comprises or consists of a polymeric material. In some examples, the first flexible substrate comprises a film of biaxial oriented polypropylene (BOPP), or polyethylene terephthalate (PET). In some examples, the PET film may comprise PET-silicon oxide, PET-aluminium oxide, PET-PVOH or PET-PVDC.

In some examples, the first flexible substrate of the flexible packaging material may be the innermost layer of the flexible packaging material in use. In some examples, the first flexible substrate of the flexible packaging material may be referred to as a functional substrate. In some examples, the first flexible substrate may be referred to as a functional substrate and may be functional in the sense that it provides a barrier function to protect the packaged goods. In some examples, the first flexible substrate may serve as a barrier to any external influence that could damage or otherwise reduce the quality of the packaged goods, in particular food, by preventing ingress of, for example, moisture, oxygen, other oxidants and pathogens such as viruses and bacteria.

In some examples, the first flexible substrate comprises an image or information surface printed (i.e. not reverse printed) on a first surface of the first flexible substrate. In some examples, the first flexible substrate is a functional substrate surface printed with an ink composition. In such examples, the second flexible substrate may be transparent such that information surface printed on the first flexible substrate van be viewed through the transparent second flexible substrate.

In some examples, the first flexible substrate comprises a, film or sheet, e.g. a thin film or sheet, of paper, metallic foil, and/or plastic. In some examples, the first flexible substrate comprises a metallic foil, a metallized substrate or a paper substrate. In some examples, the first flexible substrate comprises a metallized paper or a metallized plastic film. In some examples, the first flexible substrate comprises an aluminium foil. In some examples, the first flexible substrate is a polymeric first flexible substrate. In some examples the first flexible substrate comprises a film of a plastic material, for example, polyethylene (PE), linear low density polyethylene (LLDPE), low density polyethylene (LDPE), polypropylene (PP), biaxial oriented polypropylene (BOPP). In some examples, the first flexible substrate comprises a metallized paper in the form of a paper substrate coated on one surface with a layer of metal, for example aluminium. In some examples, the first flexible substrate comprises a metallized plastic film in the form of a polymer substrate coated on one surface with a layer of metal, for example aluminium. In some examples, the first flexible substrate comprises a metallized plastic film in the form of a metallized BOPP film, a metallized PET film, or a metallized polyethylene (PE) film.

In some examples, the first flexible substrate comprises a plurality of layers of film of material laminated together to form a pre-laminated flexible print substrate. In some examples, the flexible print substrate comprises a plurality of layers of material selected from polymeric materials (e.g. polymeric materials selected from PE, LLDPE, MDPE, PP, BOPP, PET and OPA), metallic materials (e.g. metallic foils such as aluminium foil, or metallized films such as MET-PET (e.g. Al/PET), MET-BOPP (e.g. Al/BOPP), MET-BOPA (e.g. Al/BOPA) or any other metalized substrate), paper and combinations thereof. In some examples, the flexible print substrate comprises a plurality of layers of film of a plastic material, such as a combination of films selected from PE, LLDPE, MDPE, PP, BOPP, PET and OPA, laminated together to form the pre-laminated flexible print substrate. In some examples, the pre-laminated flexible print substrate comprises an aluminium layer. In some examples, the pre-laminated flexible print substrate comprises a Paper/Alu/PE, PET/Al/PE, BOPP/MET-BOPP, Al/BOPA/PE or PET/PE laminate.

In some examples, the first flexible substrate comprises a film of a polymer, wherein the film is less than 250 µm in thickness, for example less than 100 µm in thickness, for example less than 90 µm in thickness, for example less than 80 µm in thickness, for example less than 70 µm in thickness, for example less than 60 µm in thickness, for example less than 50 µm in thickness, for example less than 40 µm in thickness, for example less than 30 µm in thickness, for example less than 20 µm in thickness, for example less than 15 µm in thickness. In some examples, the film of polymer is about 12 µm in thickness. In some examples, the film of polymer is about 9 µm in thickness.

In some examples, the first flexible substrate comprises a film of a polymer, wherein the film is greater than 9 µm in thickness, for example greater than 12 µm in thickness, for example greater than 15 µm in thickness, for example greater than 20 µm in thickness, for example greater than 30 µm in thickness, for example greater than 40 µm in thickness, for example greater than 50 µm in thickness, for example greater than 60 µm in thickness, for example greater than 70 µm in thickness, for example greater than 80

μm in thickness, for example greater than 90 μm in thickness, for example greater than 100 μm in thickness. In some examples, the film of polymer is about 100 μm in thickness.

In some examples, the first flexible substrate of the flexible packaging material comprises a sealant layer on a surface thereof other than the surface on which an ink composition is printed. In some examples, a sealant layer is disposed on a second surface of the first flexible substrate, the second surface being a surface other than the first surface of the first flexible substrate which is printed with the ink composition. The second surface may be opposed to the first surface of the first flexible substrate. In this example, the sealant layer is disposed on the innermost surface of the flexible packaging material and serves to provide means for sealing the flexible packaging material to itself or another material, with the goods to be packaged inside. In some examples the sealant layer comprises a film of low-melting, i.e. heat sealable, thermoplastic material. Suitable thermoplastic materials include those described herein in connection with the thermally activatable laminating material and include polymers of ethylene, or DuPont's SURLYN® ionomers. In some examples, the sealant layer comprises an extrudable material.

In some examples, the sealant layer comprises a thin film of a polymer, wherein the film is less than 100 μm in thickness, for example less than 90 μm in thickness, less than 80 μm in thickness, less than 70 μm in thickness, less than 60 μm in thickness, less than 50 μm in thickness, less than 40 μm in thickness, less than 30 μm in thickness, less than 20 μm in thickness, less than 15 μm in thickness. In some examples, the film of polymer is about 12 μm in thickness, in some examples about 9 μm in thickness, in some examples about 5 μm in thickness, in some examples about 2 μm in thickness.

In some examples, the sealant layer comprises a thin film of a polymer, wherein the film is greater than 2 μm in thickness, for example greater than 5 μm in thickness, for example greater than 9 μm in thickness, for example greater than 12 μm in thickness, for example greater than 15 μm in thickness, greater than 20 μm in thickness, greater than 30 μm in thickness, greater than 40 μm in thickness, greater than 50 μm in thickness, greater than 60 μm in thickness, greater than 70 μm in thickness, greater than 80 μm in thickness, greater than 90 μm in thickness. In some examples, the film of polymer is about 100 μm in thickness.

Second Flexible Substrate

In some examples, the second flexible substrate of the flexible packaging material may also be referred to as a functional substrate. In some examples, the second flexible substrate of the flexible packaging material may be the innermost layer of the flexible packaging material in use, and may thus be in contact with the packaged goods. In some examples the second flexible substrate is referred to as a functional substrate and is functional in the sense that it provides a barrier function to protect the packaged goods. In some examples, the second flexible substrate may serve as a barrier to any external influence that could damage or otherwise reduce the quality of the packaged goods, in particular food, by preventing ingress of, for example, moisture, oxygen, other oxidants and pathogens such as viruses and bacteria.

In some examples, the second flexible substrate comprises a film or sheet, e.g. a thin film or sheet, of paper, metallic foil, and/or plastic. In some examples, the second flexible substrate comprises a metallic foil, a metallized substrate or a paper substrate. In some examples, the second flexible substrate comprises a metallized paper or a metallized plastic film. In some examples, the second flexible substrate comprises an aluminium foil. In some examples, the second flexible substrate is a polymeric second flexible substrate. In some examples the second flexible substrate comprises a film of a plastic material, for example, polyethylene (PE), linear low density polyethylene (LLDPE), low density polyethylene (LDPE), polypropylene (PP), biaxially oriented polypropylene (BOPP). In some examples, the second flexible substrate comprises a metallized paper in the form of a paper substrate coated on one surface with a layer of metal, for example aluminium. In some examples, the second flexible substrate comprises a metallized plastic film in the form of a polymer substrate coated on one surface with a layer of metal, for example aluminium. In some examples, the second flexible substrate comprises a metallized plastic film in the form of a metallized BOPP film, a metallized PET film, or a metallized polyethylene (PE) film.

In some examples, the second flexible substrate comprises a plurality of layers of film of material laminated together to form a pre-laminated second flexible substrate. In some examples, the second flexible substrate comprises a plurality of layers of material selected from polymeric materials (e.g. polymeric materials selected from PE, LLDPE, MDPE, PP, BOPP, PET and OPA), metallic materials (e.g. metallic foils such as aluminium foil, or metallized films such as MET-PET (e.g. Al/PET), MET-BOPP (e.g. Al/BOPP), MET-BOPA (e.g. Al/BOPA) or any other metalized substrate), paper and combinations thereof. In some examples, the second flexible substrate comprises a plurality of layers of film of a plastic material, such as a combination of films selected from PE, LLDPE, MDPE, PP, BOPP, PET and OPA, laminated together to form the pre-laminated second flexible substrate. In some examples, the pre-laminated second flexible substrate comprises an aluminium layer. In some examples, the pre-laminated second flexible substrate comprises a Paper/Alu/PE, PET/Al/PE, BOPP/MET-BOPP, Al/BOPA/PE or PET/PE laminate.

In some examples, the second flexible substrate forms the outermost layer of the final, laminated flexible packaging material as prepared in the methods described herein, in some examples the second flexible substrate is transparent in order that an image or information printed on the first flexible substrate is visible to the consumer.

In some examples, the second flexible substrate comprises a film of a polymer, for example a thermoplastic polymer. In some examples the second flexible substrate comprises or consists of a polymeric material. In some examples, the second flexible substrate comprises a film of biaxially oriented polypropylene (BOPP), or polyethylene terephthalate (PET). In some examples, the PET film may comprise PET-silicon oxide, PET-aluminium oxide, PET-PVOH or PET-PVDC.

In some examples, the second flexible substrate comprises a film of a polymer, wherein the film is greater than 9 μm in thickness, for example greater than 12 μm in thickness, for example greater than 15 μm in thickness, for example greater than 20 μm in thickness, for example greater than 30 μm in thickness, for example greater than 40 μm in thickness, for example greater than 50 μm in thickness, for example greater than 60 μm in thickness, for example greater than 70 μm in thickness, for example greater than 80 μm in thickness, for example greater than 90 μm in thickness, for example greater than 100 μm in thickness. In some examples, the film of polymer is about 100 μm in thickness.

In some examples, the second flexible substrate comprises a film of a polymer, wherein the film is greater than 9 μm in thickness, for example greater than 12 μm in thickness, for example greater than 15 µm in thickness, for example greater than 20 µm in thickness, for example greater than 30 µm in thickness, for example greater than 40 µm in thickness, for example greater than 50 µm in thickness, for example greater than 60 µm in thickness, for example greater than 70 µm in thickness, for example greater than 80 µm in thickness, for example greater than 90 µm in thickness, for example greater than 100 µm in thickness. In some examples, the film of polymer is about 100 µm in thickness.

In some examples, the second flexible substrate of the flexible packaging material comprises a sealant layer on a surface thereof other than the surface on which the thermally activatable laminating layer is applied/contacted. In this example, the sealant layer is disposed on the innermost surface of the flexible packaging material and serves to provide means for sealing the flexible packaging material to itself or another material, with the goods to be packaged inside. In some examples the sealant layer comprises a film of low-melting, i.e. heat sealable, thermoplastic material. Suitable thermoplastic materials include those described herein in connection with the thermally activatable laminating material and include polymers of ethylene, or DuPont's SURLYN® ionomers. In some examples, the sealant layer comprises an extrudable material.

In some examples, the sealant layer comprises a thin film of a polymer, wherein the film is less than 100 µm in thickness, for example less than 90 µm in thickness, in some examples less than 80 µm in thickness, in some examples less than 70 µm in thickness, in some examples less than 60 µm in thickness, in some examples less than 50 µm in thickness, in some examples less than 40 µm in thickness, in some examples less than 30 µm in thickness, in some examples less than 20 µm in thickness, in some examples less than 15 µm in thickness. In some examples, the film of polymer is about 12 µm in thickness, in some examples about 9 µm in thickness, in some examples about 5 µm in thickness, in some examples about 2 µm in thickness.

In some examples, the sealant layer comprises a thin film of a polymer, wherein the film is greater than 2 µm in thickness, for example greater than 5 µm in thickness, for example greater than 9 µm in thickness, for example greater than 12 µm in thickness, for example greater than 15 µm in thickness, in some examples greater than 20 µm in thickness, in some examples greater than 30 µm in thickness, in some examples greater than 40 µm in thickness, in some examples greater than 50 µm in thickness, in some examples greater than 60 µm in thickness, in some examples greater than 70 µm in thickness, in some examples greater than 80 µm in thickness, in some examples greater than 90 µm in thickness. In some examples, the film of polymer is about 100 µm in thickness.

In some examples, at least one of the first flexible substrate or the second flexible substrate is transparent. In some examples, either the first flexible substrate or the second flexible substrate is transparent.

In some examples, one of the first flexible substrate and the second flexible substrate comprises a plurality of layers of film of material laminated together to form a pre-laminated flexible substrate as described above.

In some examples, one of the first flexible substrate and the second flexible substrate comprises a metallic foil, a metallized substrate or a paper substrate.

In some examples, one of the first flexible substrate and the second flexible substrate comprises or consists of a polymeric material. In some examples, one of the first flexible substrate and the second flexible substrate comprises a film of biaxially oriented polypropylene (BOPP), or polyethylene terephthalate (PET).

Ink Composition

The ink composition printed on the first flexible substrate may be an ink composition comprising an ink resin. The ink composition to be printed on the first flexible substrate may comprise an ink resin and a carrier liquid. In some examples, the ink compositions also comprises a pigment or colorant.

The ink composition printed on the first flexible substrate may be a polyvinyl chloride (PVC) ink, a polyvinyl butyral (PVB) ink, a nitrocellulose (NC) ink, a polyurethane (PU) ink, a polyamide ink or a UV curable ink (a UV ink may also be referred to as a UV ink).

Ink Resin

The ink compositions described herein may comprise an ink resin comprising a polyvinyl chloride, polyvinyl butyral, nitrocellulose, polyurethane, polyamide, a UV curable resin, or combinations thereof.

For example, a PVC ink (e.g. PVC ink ESTERAMA HBN from SunChemical) is an ink composition in which the ink resin comprises or consists of polyvinyl chloride. For example, a PVB ink (e.g. PVB ink MX INK from Siegwerk) is an ink composition in which the ink resin comprises or consists of polyvinyl butyral. For example, a NC ink (e.g. NC ink from SunChemical) is an ink composition in which the ink resin comprises or consists of nitrocellulose. For example, a PU ink (e.g. PU ink "Flexo-LAMIALL" from INX company for flexographic technology and PU ink "Gravure-LAMIALL" from INX company for rotogravure techonology) is an ink composition in which the ink resin comprises or consists of polyurethane which may be a one-component or two-component polyurethane. For example, a polyamide ink is an ink composition in which the ink resin comprises or consists of polyamide. For example, a UV ink is an ink composition in which the ink resin comprises or consists of a UV curable resin.

A UV curable resin, or a UV ink, may be curable on exposure to UV radiation (for example, radiation having a wavelength in the range of about 100 nm to about 380 nm). A UV curable resin may comprise a monomer and a pre-polymer or an oligomer which polymerise on exposure to UV radiation to form a UV cured polymer.

In some examples, the ink composition comprises an ink resin comprising polyvinyl chloride, polyvinyl butyral, nitrocellulose, polyurethane, polyamide or a UV curable resin. In some examples, the ink composition comprises an ink resin comprising polyvinyl chloride, polyvinyl butyral, nitrocellulose, polyurethane or a UV curable resin. In some examples, the ink composition comprises an ink resin comprising polyvinyl chloride, polyvinyl butyral, nitrocellulose or a polyurethane. In some examples, the ink composition comprises an ink resin comprising polyvinyl chloride, polyvinyl butyral or nitrocellulose.

Colorant

The ink composition may comprise a colorant. The colorant may be a dye or pigment. The colorant can be any colorant compatible with the liquid carrier and useful for printing, for example useful in rotogravure or flexographic printing processes. For example, the colorant may be present as pigment particles, or may comprise a resin (in addition to the polymers described herein) and a pigment. The resins and pigments can be any of those standardly used. In some examples, the colorant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. Where the pigment is a white pigment particle, the pigment particle may be selected from the group consisting of $TiO_2$, calcium carbonate, zinc oxide, and mixtures thereof. In some examples the white pigment particle may comprise an alumina-$TiO_2$ pigment.

Carrier Liquid

In some examples the ink composition comprises a carrier liquid or fluid. In some examples, the ink composition comprises ink resin particles or ink resin coated pigment particles which are formed in and/or dispersed in a carrier fluid or carrier liquid.

Before application to the print substrate in a printing process, the ink composition may be an ink composition in a liquid form, and may comprise a carrier liquid in which is suspended ink resin particles or pigment particles coated with the ink resin.

In some examples, an ink composition used to form a printed ink composition on the first flexible substrate is a solvent-based ink composition or a water-based ink composition.

For example, the liquid carrier may be selected from water, alcohol (e.g. ethanol, N-propanol), toluene, xylene, petroleum spirits, ethyl acetate, MEK, or combinations thereof. In some examples, the liquid carrier is selected from water, alcohol (e.g. ethanol), toluene, xylene, ethyl acetate or combinations thereof. For example, a water based ink composition may comprise a carrier liquid comprising or consisting of water, in some examples water and an alcohol. For example, a solvent based ink composition may comprise a carrier liquid selected from alcohol, toluene. xylene or ethyl acetate, e.g. N-propanol or ethyl acetate.

Before printing, the carrier liquid can constitute about 20% to 99.5% by weight of the ink composition, in some examples 50% to 99.5% by weight of the ink composition. Before printing, the carrier liquid may constitute about 40 to 90% by weight of the ink composition. Before printing, the carrier liquid may constitute about 60% to 80% by weight of the ink composition. Before printing, the carrier liquid may constitute about 90% to 99.5% by weight of the ink composition, in some examples 95% to 99% by weight of the ink composition.

The ink composition, when printed on the print substrate, may be substantially free from carrier liquid. In a printing process and/or afterwards, the carrier liquid may be removed, e.g. by evaporation. In some examples, the ink composition printed on the print substrate comprises substantially no liquid carrier liquid, for example by evaporation of the liquid carrier from the ink composition during and/or after printing. Substantially free from carrier liquid may indicate that the ink printed on the print substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed on the print substrate is free from carrier liquid.

Thermally Activatable Laminating Material

The flexible packaging material and the processes for preparing the flexible packaging material comprise a layer of a thermally activatable laminating material layer, also referred to as a thermal laminating material or layer or thermally activatable laminating layer.

In some examples, the thermally activatable laminating layer may comprise or consist of a thermally activatable polymer, for example a thermoplastic polymer resin. In some examples the thermally activatable laminating layer comprises a low-melting polymer. The term "low-melting polymer" is to be understood as a polymeric material which is solid at room temperature but melts at a temperature obtainable in a printing or laminating apparatus.

In some examples, the thermally activatable polymer is selected from a copolymer of an alkylene monomer and an acrylic acid or methacrylic acid monomer, a copolymer of an alkylene monomer and an alkyl acrylate or alkyl methacrylate monomer, a polyurethane, an ionomer, a copolymer of alkylene monomers, a maleic anhydride modified polyalkylene and an acid modified polyolefin. In some examples, the thermally activatable polymer is selected from a copolymer of an alkylene monomer and an acrylic acid or methacrylic acid monomer, a copolymer of an alkylene monomer and an alkyl acrylate or alkyl methacrylate monomer, a polyurethane, an ionomer, a copolymer of alkylene monomers and a maleic anhydride modified polyalkylene In some examples, the thermally activatable polymer may be selected from ethylene or propylene acrylic acid copolymers; ethylene or propylene methacrylic acid copolymers; copolymers of ethylene and propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polypropylene; co-polymers of ethylene ethyl acrylate; copolymer of ethylene and butyl acrylate; ethylene-acrylic acid ionomers and combinations thereof.

In some examples, the thermally activatable polymer may be a low-melting polymer with a melting point of less than about 250° C., for example less than about 220° C., for example less than about 190° C., for example less than about 180° C., for example less than about 170° C., for example less than about 160° C., for example less than about 150° C., for example less than about 140° C., for example less than about 130° C., for example less than about 120° C., for example less than about 110° C., for example less than about 100° C., for example less than about 80° C., for example less than about 70° C., for example less than about 60° C.

In some examples, the thermally activatable polymer may be a low-melting polymer with a melting point of greater than about 60° C., for example greater than about 70° C., for example greater than about 80° C., for example greater than about 90° C., for example greater than about 100° C., for example greater than about 110° C., for example greater than about 120° C., for example greater than about 130° C., for example greater than about 140° C., for example greater than about 150° C., for example greater than about 160° C., for example greater than about 170° C., for example greater than about 180° C., for example greater than about 190° C., for example great than about 200° C., for example great than about 220° C., for example great than about 250° C.

In some examples, the thermally activatable polymer may be a low-melting polymer with a melting point in the range of from about 60° C. to about 120° C.

In some examples, the melting point of a low melting polymer may be the melting point measured according to ASTM D3418.

By using a low-melting polymer as the thermally activatable polymer of the thermally activatable laminating material, using the low-melting thermally activatable polymer as the thermally activatable laminating material, to form the thermally activatable laminating layer, it becomes possible to extrude the thermally activatable laminating material onto the second flexible substrate to form a layered structure for laminating to the printed substrate.

In some examples, the thermally activatable laminating layer comprises a thin film of a thermally activatable polymer, wherein the film is less than 100 µm in thickness, for example less than 80 µm in thickness, less than 60 µm in thickness, less than 50 µm in thickness, less than 40 µm in thickness, less than 30 µm in thickness, less than 20 µm in thickness, less than 10 µm in thickness, less than 9 µm in thickness, less than 8 µm in thickness, less than 7 µm in thickness, less than 6 µm in thickness, less than 5 µm in thickness, less than 4 µm in thickness, less than 3 µm in thickness. In some examples, the film of thermally activatable polymer is about 2 µm in thickness.

In some examples, the thermally activatable laminating layer or material comprises a thin film of a thermally activatable polymer, wherein the film is greater than 2 µm in thickness, for example greater than 3 µm in thickness, greater than 4 µm in thickness, greater than 5 µm in thickness, greater than 6 µm in thickness, greater than 7 µm in thickness, greater than 8 µm in thickness, greater than 9 µm in thickness, greater than 10 µm in thickness, greater than 20 µm in thickness, greater than 30 µm in thickness, greater than 40 µm in thickness, greater than 50 µm in thickness, greater than 60 µm in thickness, greater than 80 µm in thickness, greater than 100 µm in thickness. In some examples, the film of thermally activatable polymer is about 100 µm in thickness.

In some examples, the thermally activatable laminating layer comprises a thin film of a thermally activatable polymer, wherein the film has a coating weight of less than 50 grams per square metre (gsm), for example less than 40 gsm for example less than 30 gsm for example less than 20 gsm for example less than 15 gsm for example less than 10 gsm for example less than 9 gsm for example less than 9 gsm, less than 8 gsm, less than 7 gsm, less than 6 gsm, less than 5 gsm, less than 4 gsm, less than 3 gsm. In some examples, the weight of the film of thermally activatable polymer is about 2 gsm.

In some examples, the thermally activatable laminating layer comprises a thin film of a thermally activatable polymer, wherein the film is greater than 2 gsm in weight, for example greater than 3 gsm, greater than 4 gsm, greater than 5 gsm, greater than 6 gsm, greater than 7 gsm, greater than 8 gsm, greater than 9 gsm, greater than 10 gsm, greater than 15 gsm, greater than 20 gsm, greater than 30 gsm, greater than 40 gsm. In some examples, the weight of the film of thermally activatable polymer is about 50 gsm.

In some examples, the thermally activatable polymer may have a melt flow index of up to about 50 g/10 min, in some examples up to about 40 g/10 min, in some examples up to about 30 g/10 min, in some examples up to about 20 g/10 min, in some examples up to about 14 g/10 min, in some examples up to about 10 g/10 min.

In some examples, the thermally activatable polymer may have a melt flow index of at least about 0.1 g/10 min, in some examples at least about 1 g/10 min, in some examples at least about 2 g/10 min.

In some examples, the thermally activatable polymer has a melt flow index in the range of from about 1 g/10 min to about 20 g/10 min, in some examples 2 g/10 min to about 14 g/10 min. The melt flow rate can be measured using standard procedures, for example as described in ASTM D1238.

In some examples, the thermally activatable polymer may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures, for example using the procedure described in ASTM D1386.

In some examples, the thermally activatable polymer may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures, for example as described in ASTM D1238.

The acidic side groups may be in free acid form or may be in the form of an anion and associated with a counterion, e.g. metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The thermally activatable laminating layer or material may comprise two different polymers, e.g thermally activatable polymers, having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The thermally activatable laminating layer or material may comprise two different polymers, e.g. thermally activatable polymers, having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The thermally activatable laminating layer or material may comprise a polymer, e.g. a thermally activatable polymer, having a melt viscosity of 15000 poise or less, in some examples a melt viscosity of 10000 poise or less, in some examples 1000 poise or less, in some examples 100 poise or less, in some examples 50 poise or less, in some examples 10 poise or less. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the thermally activatable laminating layer or material comprises a single type of polymer, e.g. thermally activatable polymer, the polymer may have a melt viscosity of 6000 poise or more, in some examples a melt viscosity of 8000 poise or more, in some examples a melt viscosity of 10000 poise or more, in some examples a melt viscosity of 12000 poise or more.

If the thermally activatable laminating layer or material comprises a plurality of polymers all the polymers may together form a mixture that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The thermally activatable laminating layer or material may comprise a polymer, e.g. thermally activatable polymer, having acidic side groups, as described above (which may be free of ester side groups), and a polymer having ester side groups. The polymer, e.g. thermally activatable polymer, having ester side groups may be a thermoplastic polymer. The polymer, e.g. thermally activatable polymer, having ester side groups may further comprise acidic side groups. The polymer, e.g. thermally activatable polymer, having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, for example, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

In some examples, the thermally activatable polymer may be a polymer having ester side groups. In some examples, the thermally activatable polymer may be a co-polymer of a monomer having ester side groups, a monomer having acidic side groups and a monomer which is an alkylene monomer absent of any acidic and ester side groups. The thermally activatable polymer, having ester side groups may be a co-polymer of (i) a monomer having ester side groups selected from esterified acrylic acid or esterified methacrylic acid, in some examples an alkyl ester of acrylic or methacrylic acid, (ii) a monomer having acidic side groups selected from acrylic or methacrylic acid and (iii) a monomer which is an alkylene monomer selected from ethylene and propylene. In some examples, the thermally activatable polymer may be a polymer having ester side groups. In some examples, the thermally activatable polymer may be a co-polymer of a monomer having ester side groups and an alkylene monomer. The thermally activatable polymer, having ester side groups may be a co-polymer of (i) a monomer having ester side groups selected from esterified acrylic acid or esterified methacrylic acid, in some examples an alkyl ester of acrylic or methacrylic acid (e.g. methyl acrylate or butyl acrylate) and (ii) a monomer which is an alkylene monomer selected from ethylene and propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes. The polymer having ester side groups may have a melt flow rate of about 1 g/10 minutes to about 120 g/10 minutes, in some examples about 1 g/10 minutes to about 50 g/10 minutes, in some examples about 2 g/10 minutes to about 14 g/10 minutes.

The polymer, polymers, co-polymer or co-polymers, e.g. thermally activatable polymer, of the thermally activatable laminating material can in some examples be selected from the AC family of polymers (e.g. AC-5120, AC-5180, AC-540, AC-580 (sold by Honeywell)), the Aclyn family of polymers (e.g. Aclyn 201, Aclyn 246, Aclyn 285, and Aclyn 295), the Lotader family of polymers (e.g. Lotader 2210, Lotader, 3430, and Lotader 8200 (sold by Arkema)), the Orevac family of polymers (e.g. Orevac 18754 (sold by Arkema)), the Lotryl family of polymers (e.g. Lotryl MA03, Lotryl 29MA03, Lotryl 18MA02, Lotryl 24 MA, Lotryl 17 BA 04 (sold by Arkema)), the Escor family of polymers (e.g. Escor 5020 7.5%, Escore 5000 Exco 6%, Escore 5100 Exco 11% (sold by Exxon Mobil)), the Tafmer family of polymers (e.g. Tafmer MA9015 (sold by Mitsui)), the Admer family of polymers (e.g. Admer AT1955E, Admer AT 1707E (sold by Mitsui)), the Notio family of polymers (e.g. PN-2060 (sold by Mitsui)), the Appeel family of polymers (e.g. Appeel 20D867 (sold by DuPont)), the Amplify family of polymers (e.g. Amplify EA-100 and Amplify GR-204 (sold by Dow)), the Acryft family of polymers (e.g. Acryft WD301 and Acryft WK402 (sold by Somitomo)) and the Surlyn family of polymers (e.g. Surlyn 1652, Surlyn 1857, Surlyn 8940 (sold by DuPont)).

Process for Preparing the Flexible Packaging Material

Described herein is a process for preparing a flexible packaging material comprising:

providing a first flexible substrate having a first surface on which an ink composition is printed, the printed ink composition comprising an ink resin comprising polyvinyl chloride, polyvinyl butyral, nitrocellulose, polyurethane, polyamide, a UV curable resin, or combinations thereof;

providing a second flexible substrate;

depositing a layer of thermally activatable laminating material onto one of a first surface of the second flexible substrate and the first surface of the first flexible substrate on which the ink composition is printed, the thermally activatable laminating material comprising a thermally activatable polymer selected from a copolymer of an alkylene monomer and an acrylic acid or methacrylic acid monomer, a copolymer of an alkylene monomer and an alkyl acrylate or alkyl methacrylate monomer, a polyurethane, an ionomer, a copolymer of alkylene monomers, a maleic anhydride modified polyalkylene and an acid modified polyolefin; and contacting under conditions of heat and/or pressure the layer of thermally activatable laminating material with the other of the second flexible substrate and the first surface of the first flexible substrate on which the ink composition is printed.

Also described herein is a flexible packaging material made by the process described herein.

The processes of the present disclosure are depicted generally in FIGS. 1a) and 1b), in which the following reference numerals are used to identify the features indicated: reference numeral "1" denotes a second flexible substrate; reference numeral "2" denotes a layer of a thermally activatable laminating material; reference numeral "3" denotes a first flexible (print) substrate; reference numeral "4" denotes an ink composition and reference numeral "5" denotes a flexible packaging material.

FIG. 1a) depicts a process in which a layer of a thermally activatable laminating material 2 is deposited onto a second flexible material 1. The layer of thermally activatable laminating material 2 is then thermally laminated with a first surface of a first flexible (print) substrate 3 on which a printed ink composition 4 is disposed to form a flexible packaging material 5 by contacting under conditions of heat and/or pressure.

FIG. 1b) depicts a process in which a layer of a thermally activatable laminating material 2 is deposited onto a first surface of a first flexible (print) substrate 3 comprising a printed ink composition 4. The layer of thermally activatable laminating material 2 is then thermally laminated with a second flexible substrate 1 to form a flexible packaging material 5 by contacting under conditions of heat and/or pressure.

Each feature of the processes will be described in more detail below.

In some examples, a process for preparing a flexible packaging material comprises printing an ink composition onto a first surface of a first flexible substrate 3, or providing a first flexible substrate 3 comprising an ink composition 4 printed on a first surface of the first flexible substrate 3.

In some examples, the substrate comprises a first flexible substrate 3 as described herein previously. In some examples, the ink composition 4 used in the process comprises an ink composition as described herein previously. The ink composition may be printed onto the first surface of the first flexible substrate 3 in a rotogravure, flexographic, screen printing or offset printing apparatus, in some examples a rotogravure or flexographic printing apparatus.

In some examples, the first flexible substrate 3 comprises a transparent material and the ink composition 4 is printed onto a first surface thereof in a reverse printing process such that the printed image or information appears correct when viewed through the first flexible substrate. By using the reverse printing process, and thermally laminating the printed surface of the first flexible substrate to the functional substrate (as described below), the printed image or information is viewed correctly in the final product and is protected from damage by the first flexible substrate 3 which forms the outermost layer of the packaging material. The first flexible substrate 3 printed with an image or information can be wound onto a roll or spool and stored until lamination is carried out.

In some examples, a process for preparing a flexible packaging material 5 comprises providing a second flexible substrate 1, in some examples a second flexible substrate 1 comprising a polyethylene, a bi-axially oriented polypropylene (BOPP), a polyethylene teraphthalate (PET), a paper and/or a metallic film; and depositing a thermally activatable laminating layer onto one of the second flexible substrate and the first surface of the substrate printed with the ink composition.

The term "deposition", as used herein, is to be understood as meaning applying a layer of thermally activatable laminating material either to the first flexible substrate 3 printed with the ink composition or to the second flexible substrate 1 in such a manner that the materials form a structure, for example a film, of defined layers of different materials.

In some examples, the depositing a thermally activatable laminating layer on the first or second flexible substrate comprises rotogravure coating, screen printing, flexo coating, water-based coating, solvent-based coating and/or extrusion coating.

In some examples, the thermally activatable laminating layer may be applied to the first surface of the first flexible substrate or a first surface of the second flexible substrate using a water-based coating or solvent-based coating technique, for example by providing a thermally activatable laminating material comprising a water-based dispersion of a thermally activatable polymer or a solvent-based dispersion of a thermally activatable polymer and coating the first surface of the first flexible substrate or a first surface of the second flexible substrate with the thermally activatable laminating material using gravure or flexo techniques.

In some examples, a process for preparing a flexible packaging material comprises extruding a thermally activatable laminating material onto a first surface of a second flexible substrate to form a layer of a thermally activatable laminating material disposed on the first surface of the second flexible substrate, or providing a second flexible substrate with a thermally activatable laminating layer extruded onto a first surface of the second flexible substrate. In some examples, a process for preparing a flexible packaging material comprises extruding a thermally activatable laminating material onto a first surface of a first flexible substrate printed with an ink composition to form a layer of a thermally activatable laminating material disposed on the first surface of the first flexible substrate, or providing a first flexible substrate printed with an ink composition with a thermally activatable laminating layer extruded onto a first surface of the first flexible substrate printed with the ink composition. The term "extrusion", as used herein, is to be understood as meaning melting the thermally activatable laminating material and passing it through an extrusion die onto a first flexible substrate or a second flexible substrate in such a manner that the materials form a structure, for example a film, of defined layers of different materials.

In some examples, the second flexible substrate is a pre-formed second flexible substrate comprising a thermally activatable laminating layer disposed on a surface thereof. In some examples, the thermally activatable laminating layer or thermally activatable laminating material comprise a layer or material as described previously In some examples, extrusion of the thermally activatable laminating material onto the second flexible substrate or the first flexible substrate to form a layered structure can be performed using any apparatus suited to extrusion processes in which one material is extruded onto a second flexible substrate or a first flexible substrate to form layered films. In the example in which the thermally activatable laminating material comprises a blend of materials, each component of the thermally activatable laminating material may be melt blended and then extruded to form pellets of blended thermally activatable laminating material. These pellets may then be used to extrude a thermally activatable laminating layer disposed on a second flexible substrate or a first flexible substrate.

In some other examples, the thermally activatable laminating material may comprise a blend of materials, the blend being achieved by dry blending pellets of each component and adding the mixture of pellets to an extruding machine used to extrude the thermally activatable laminating material and form the layered structure of a thermally activatable laminating layer disposed on a second flexible substrate or a first flexible substrate.

In some examples, a process for preparing a flexible packaging material comprises co-extruding a polymeric second flexible substrate with a thermally activatable laminating material to form a thermally activatable laminating layer disposed on a polymeric second flexible substrate, or providing a second flexible substrate comprising a polymeric second flexible substrate co-extruded with a thermally activatable laminating layer. The term "co-extrusion", as used herein, is to be understood as meaning separately melting two or more materials and passing them through separate extrusion dies in such a manner that the materials form a structure, for example a film, of defined layers of different materials. The separately extruded materials may be delivered to a single extrusion head or die which extrudes the materials in the final, desired form. The materials from each extruder do not mix in the final extrusion die. Instead, the material layers are combined and flow out of the die as a stacked multilayer product.

In some example, co-extrusion of a polymeric second flexible substrate with a thermally activatable laminating material to form a layered structure can be performed using any apparatus suited to co-extrusion to form layered films. In the example in which one or both of the polymeric second flexible substrate and thermally activatable laminating material comprise a blend of materials, each component of the polymeric second flexible substrate or thermally activatable laminating material may be melt blended and then extruded to form pellets of blended polymeric second flexible substrate and/or pellets of thermally activatable laminating material. These pellets may then be used to co-extrude a thermally activatable laminating layer disposed on a polymeric base layer.

In some examples, the polymeric second flexible substrate or thermally activatable laminating material may each comprise a blend of materials, the blend being achieved by dry blending pellets of each component and adding the mixture of pellets to the extruding machine used to co-extrude the materials and form the layered structure of a thermally activatable laminating layer disposed on a polymeric second flexible substrate.

In some examples, co-extruding a polymeric second flexible substrate with a thermally activatable laminating material to form a thermally activatable laminating layer disposed on a polymeric second flexible substrate may further comprise co-extrusion of a sealant material to form a sealant layer disposed on a surface of the polymeric second flexible substrate other than the surface on which the thermally activatable laminating layer is disposed.

The material used to form the sealant layer may be as described previously. Thus, in some examples, co-extrusion comprises co-extrusion of a polymeric second flexible substrate, a thermally activatable laminating material and a sealant material in such a manner that a multi-layer or trilayer material is obtained in which a polymeric second flexible substrate has a thermally activatable laminating layer disposed on a first surface and a sealant layer disposed on a surface other than the first surface.

In some examples, the process may further comprise deposition of a sealant material to form a sealant layer disposed on a surface of the second flexible substrate other than the surface on which the thermally activatable laminating layer is disposed. The material used to form the sealant layer may be as described previously. In some examples, depositing the sealant material onto the second flexible substrate may occur before or after contacting the thermally activatable laminating material with the second flexible substrate or depositing the thermally activatable laminating material on the second flexible substrate. In some examples, depositing the sealant material may take place by any suitable process, for example, extrusion coating, flexo coating, gravure or screen printing. Thus, in some examples, depositing a thermally activatable laminating material and depositing a sealant material result in a multi-layer or trilayer material being obtained in which a second flexible substrate or material has a thermally activatable laminating layer disposed on a first surface and a sealant layer disposed on a second surface (i.e. a surface other than the first surface). In some examples, the second flexible substrate and sealant layer are pre-formed as a functional substrate.

Figure 2A:
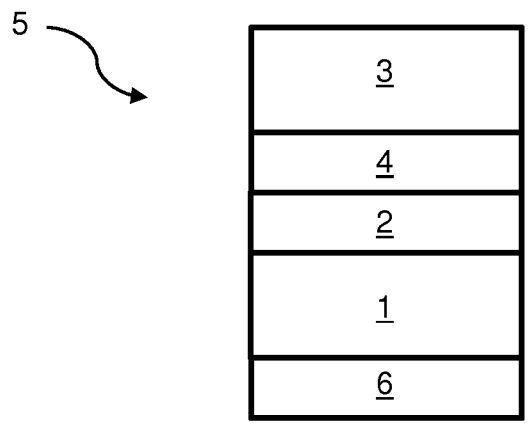
FIG. 2a is a schematic illustration of a flexible packaging material.

FIG. 2a illustrates a flexible material 5 comprising a first flexible substrate 3 having a first surface on which an ink composition 4 is disposed and a second flexible substrate 1 having a first surface which is laminated to the first surface of the first flexible substrate 3 printed with an ink composition 4 via a thermally activated laminating layer 2. In this example, the flexible material 5 comprises a sealant layer 6 disposed on a second surface (i.e. a surface other than the surface on which the thermally activated laminating layer 2 is disposed) of the second flexible substrate 1. In this example, the ink composition 4 may be reverse printed on the first surface of the first flexible substrate 3 and the first flexible substrate 3 may be transparent such that the reverse printed ink composition 4 may be viewable through the second surface of the first flexible substrate 3. The flexible material 5 shown in FIG. 2a may be formed into a flexible package by sealing sections of flexible material 5 together using the sealant layer 6. In some examples, the process may further comprise deposition of a sealant material to form a sealant layer disposed on a second surface (i.e. a surface other than the surface on which the ink composition is disposed) of the first flexible substrate. In some examples, a sealant layer may be disposed on a second surface of the first flexible substrate when the ink composition is surface printed (i.e. not reverse printed) on the first surface of the first flexible substrate. In such examples, the second flexible substrate may be transparent such that a surface printed ink composition on the first surface of the first flexible substrate is viewable through the second flexible substrate. The material used to form the sealant layer may be as described previously. In some examples, depositing the sealant material onto the first flexible substrate may occur before printing the ink composition onto the first surface of the first flexible substrate, in some examples after printing of the ink composition onto the first surface of the first flexible substrate, in some examples before contacting the first flexible substrate with the thermally activatable layer or depositing the thermally activatable laminating material on the first flexible substrate, in some examples after contacting the first flexible substrate with the thermally activatable layer or depositing the thermally activatable laminating material on the first flexible substrate. In some examples, depositing the sealant material may take place by any suitable process, for example, extrusion coating, flexo coating, gravure coating or screen printing. Thus, in some examples, depositing a thermally activatable laminating material and depositing a sealant material result in a multi-layer or trilayer material being obtained in which the first flexible substrate has a thermally activatable laminating layer disposed on a first surface printed with an ink composition and a sealant layer disposed on a second surface of the first flexible substrate. In some examples, the first flexible substrate and sealant layer are pre-formed as a functional substrate.

Figure 2B:
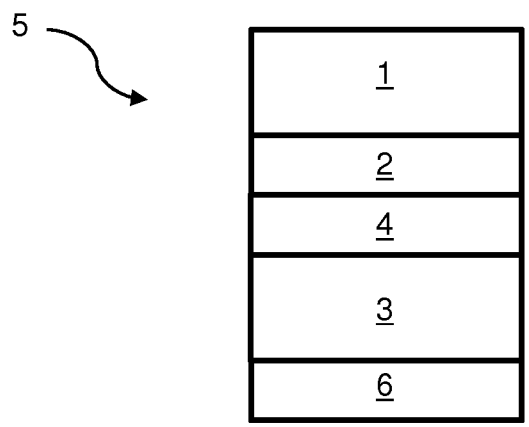
FIG. 2b is a schematic illustration of a flexible packaging material.

FIG. 2b illustrates a flexible material 5 comprising a first flexible substrate 3 having a first surface on which an ink composition 4 is disposed and a second flexible substrate 1 having a first surface which is laminated to the first surface of the first flexible substrate 3 printed with an ink composition 4 via a thermally activated laminating layer 2. In this example, the flexible material 5 comprises a sealant layer 6 disposed on a second surface (i.e. a surface other than the surface on which the printed ink composition 4 is disposed) of the first flexible substrate 3. In this example, the ink composition 4 may be surface printed on the first surface of the first flexible substrate 3 and the second flexible substrate 1 may be transparent such that the surface printed ink composition 4 may be viewable through the second surface of the second flexible substrate 1. The flexible material 5 shown in FIG. 2b may be formed into a flexible package by sealing sections of flexible material 5 together using the sealant layer 6.

In some examples, a process for preparing a flexible packaging material comprises contacting under conditions of heat and/or pressure the thermally activatable laminating layer with the other of the second flexible substrate and the first surface of the first flexible substrate printed with the ink composition. Contacting under conditions of heat and/or pressure the thermally activatable laminating layer with the other of the second flexible substrate and the first surface of the first flexible substrate printed with the ink composition may be referred to as a lamination or thermal lamination.

In some examples, the thermally activatable laminating layer has been deposited onto the second flexible substrate, and the thermally activatable laminating layer is contacted with the first surface of the first flexible substrate printed with the ink composition. In some examples, the thermally activatable laminating layer has been deposited onto the first surface of the first flexible substrate printed with the ink composition, and the thermally activatable laminating layer is contacted with the second flexible substrate.

In some examples, the result of contacting under conditions of heat and/or pressure the thermally activatable laminating layer with the other of the second flexible substrate and the first surface of the first flexible substrate printed with the ink composition is a thermally laminated flexible packaging material, which, as mentioned previously, may comprise the first flexible substrate as the intended outermost layer of the packaging in use, or the second flexible substrate as the intended outermost layer of packaging in use, thus protecting from damage the printed image or information formed by the ink composition. In some examples, the first flexible substrate printed with the image or information is brought into a particular alignment with the second flexible substrate or functional substrate before being subjected to thermal lamination.

In some examples, lamination produces the flexible packaging material which is ready for use immediately upon cooling to room temperature. Thus, in some examples, the processes for preparing a flexible packaging material described herein require no additional curing time, or stated differently, zero curing time.

In some examples, a process for preparing a flexible packaging material comprises contacting under conditions of heat and/or pressure the thermally activatable laminating layer with one of the second flexible substrate and the first surface of the first flexible substrate printed with the ink composition, and cooling the thermally laminated flexible packaging material to room temperature, thereby obtaining a ready-to-use flexible packaging material.

In some examples, lamination may be carried out on any apparatus suited for performing such a task. The laminating apparatus on which thermal lamination may be carried out may comprise pre-heating rolls, heating or nip rolls, and chill or cooling rolls through which the thermally laminated multilayer material passes, to further speed up the cooling process. Laminating carried out on the nip roll may be carried out at a temperature and a pressure to partially melt the thermally activatable laminating material at the laminating nip, and thereby create a bond between the materials.

In some examples, the temperature for lamination or the laminating nip may be less than about 185° C., for example less than about 150° C., for example less than about 120° C., for example less than about 110° C., for example less than about 100° C., for example less than about 90° C., for example about 80° C.

In some examples, the temperature for lamination or the laminating nip may be greater than about 80° C., for example greater than about 90° C., for example greater than about 100° C., for example greater than about 110° C., for example greater than about 120° C., for example about 150° C. It will be understood that the temperature for efficient thermal lamination will depend on the nature or composition of the thermally activatable laminating material and the associated melting temperature.

In some examples, the pressure for lamination or the laminating nip may be less than about 10 bar, for example less than about 9 bar, for example less than about 8 bar, for example less than about 7 bar, for example less than about 6 bar, for example less than about 5 bar, for example less than about 4 bar, for example less than about 3 bar, for example about 2 bar.

In some examples, the pressure for lamination or the laminating nip may be greater than about 2 bar, for example greater than about 3 bar, for example greater than about 4 bar, for example greater than about 5 bar, for example greater than about 6 bar, for example greater than about 7 bar, for example greater than about 8 bar, for example greater than about 9 bar, for example about 10 bar. It will be understood that the temperature and pressure or efficient thermal lamination will depend on the nature or composition of the thermally activatable laminating material and the associated melting temperature.

EXAMPLES

The following illustrates examples of the methods and related aspects described herein. Thus, these examples should not be considered as restricting the present disclosure, but are merely in place to teach how to make examples of compositions of the present disclosure. As such, a representative number of compositions and their method of manufacture are disclosed herein.

Materials
Thermally Activatable Laminating Materials (TALM)

LOTRYL 29MA03 is an ethylene methyl acrylate copolymer available from Arkema; LOTRYL 24MA02 is an ethylene methyl acrylate copolymer available from Arkema; LOTRYL 17 BA04 is a copolymer if ethylene and butyl acrylate available from Arkema; Escor 5020 [7.5%] is an ethylene acrylic acid copolymer available from Exxon Mobil; Acryft WH303 is an ethylene methyl methacrylate copolymer (EMMA) from Sumitomo; Tafmer MA9015 is an acid modified polyolefin elastomer from Mitsui; Surlyn 6251 is a zinc ionomer from DuPont company; Pureseal HS1040 is a water-based urethane based coating, available from Ashland company; Pureseal HS1020 is a water-based urethane based coating, available from Ashland company; G-680 is a water-based dispersion of an ethylene acrylic acid copolymer available from Mica corporation; HME-118B is a water-based polymer dispersion available from Mica corporation; HME-160 is a water-based polymer dispersion available from Mica corporation; HME-261 is a water-based polymer dispersion available from Mica corporation; EX-8317 is a water-based polymer dispersion available from Coim; RB501BF (BorPure™ RB501BF) is a polypropylene random copolymer available from Borealis AG; Hostalen GD 9550F is a HDPE available from LyondellBasell; Enable 20-10 CB-metallocene is a metallocene ethylene-hexane copolymer (LDPE) available from Exxon Mobil.

Inks
  NC ink—NC ink from Sun Chemical.
  PVB ink—MX INK from Siegwerk.
  PVC ink—PVC ink ESTERAMA HBN from SunChemical).
  PU ink—PU ink "Flexo-LAMIALL" from INX company for flexographic technology and PU ink "Gravure-LAMIALL" from INX company for rotogravure technology.

First Flexible (Print Substrate)

PET, BOPP and BOPA, SiOx PET from Mitsubishi, AlOx PET- from Toray, PET-PVDC-from Shiner from, PET-PVOH from Shiner films used as flexible substrates were commercially available films, obtainable from, for example Polyplex Corporation (PET; 12 micron film), Dor Film (BOPP; 18-40 microns) and Xiamen Changsu Industry, China (BOPA) or Hyosung, South Korea (BOPA).

Second Flexible Substrate Materials

Hostalen GD 9550F is a HDPE available from LyondellBasell; Enable 20-10 CB-metallocene is a metallocene ethylene-hexane copolymer (LDPE) available from Exxon Mobil; PP-Moplen 2152 is a polypropylene available from LyondellBasell.

PET, BOPP and BOPA. SiOx PET from Mitsubishi, AlOx PET- from Toray, PET-PVDC-from Shiner from, PET-PVOH from Shiner films used as flexible substrates were commercially available films, obtainable from, for example Polyplex Corporation (PET; 12 micron film), Dor Film (BOPP; 18-40 microns) and Xiamen Changsu Industry, China (BOPA) or Hyosung, South Korea (BOPA).

Al/PE: (7 μm/20-200 μm) pre laminated Alu-foil with Polyethylene film (Al foil laminated to Polyethylene film by adhesive or extrusion coating or extrusion lamination).

MET-BOPP (18-40 μm): metallized BOPP film.

Al/BOPA/PP (7 μm/15-25 μm/20-200 μm) pre laminated material (Al foil laminated to BOPA film laminated to PP film by adhesive).

PET-AlOx/BOPA/PP (12 μm/15 μm/70 μm) pre laminated material (AlOx disposed on PET film laminated to BOPA film laminated to PP film by adhesive).

PET/BOPA/PP (12 μm/15 μm/70 μm) pre laminated material (PET film laminated to BOPA film laminated to PP film by adhesive).

PE film (90 μm)

PET-SiOx/BOPA/PP (12 μm/15 μm/70 μm) pre laminated material (SiOx disposed on PET film laminated to BOPA film laminated to PP film by adhesive).

PET-PVOH/BOPA/PP (13 μm/15 μm/70 μm) pre laminated material (PVOH coated on PET film laminated to BOPA film laminated to PP film by adhesive).

PET-PVDC/BOPA/PP (13 μm/15 μm/70 μm) pre laminated material (PVDC coated on PET film laminated to BOPA film laminated to PP film by adhesive).

PET-SiOx/BOPA/PE (12 μm/15 μm/70 μm) pre laminated material (SiOx disposed on PET film laminated to BOPA film laminated to PE film by adhesive).

PET-PVOH/BOPA/PE (13 μm/15 μm/70 μm) pre laminated material (PVOH coated on PET film laminated to BOPA film laminated to PE film by adhesive).

PET-PVDC/BOPA/PE (13 μm/15 μm/70 μm) pre laminated material (PVDC coated on PET film laminated to BOPA film laminated to PE film by adhesive).

PET-SiOx/PP (12 μm/70 μm) pre laminated material (SiOx disposed on PET film laminated to PP film by adhesive).

PET-PVOH/PP (13 μm/70 μm) pre laminated material (PVOH coated on PET film laminated to PP film by adhesive).

PET-PVDC/PP (13 μm/70 μm) pre laminated material (PVDC Coated on PET film laminated to PP film by adhesive).

PET-SiOx/PE (12 μm/70 μm) pre laminated material (SiOx disposed on PET film laminated to PE film by adhesive).

PET-PVOH/PE (13 μm/70 μm) pre laminated material (PVOH Coated on PET film laminated to PE film by adhesive).

PET-PVDC/PE (13 μm/70 μm) pre laminated material (PVDC Coated on PET film laminated to PE film by adhesive).

PET-AlOx/PP (12 μm/70 μm) pre laminated material (AlOx coated on PET film laminated to PP film by adhesive).

Sealant Layer

Hostalen GD 9550F is a HDPE available from LyondellBasell; Enable 20-10 CB-metallocene is a metallocene ethylene-hexane copolymer (LDPE) available from Exxon Mobil; PP-Moplen 2152 is a polypropylene available from LyondellBasell.

Apparatus

Flexographic printing machine: Telia FSC from Dolci—Bielloni Company (Conditions: Main unwinder—corona treatment 2-2.5 kW, film tension 15 N; Central Drum Color CYMBW 100% coverage of each; Oven temperature—Area I 60-75° C., Area II 70-80° C., Area III 75-90° C.; Linear Speed 130-150 m/min).

Rotogravure printing machine: Rotomec MW 80 Company (Conditions: Main unwinder—corona treatment 2 kW, film tension 10-15 N; Printing Stations—CYMBW each 100% coverage; Oven temperature for drying 65-95° C.; Linear Speed 160-220 m/min).

Laminator: LaboCombi 400 from Nordmeccanica (modified to allow hearing of the nip roll up to 180° C.).

Coextruder: Dr Collin type extruder.

Extruder Coating Machine: ER-WE-PA: Davis Standard 3 extruders 1200 mm width.

General Methodology

1. Printing on First Flexible Substrate

Samples of first flexible substrates described above were printed with ink compositions selected from NC ink, PVB ink, PVC ink and PU ink using flexographic or rotogravure printing technologies as described above.

2. Provision of First or Second Flexible Substrate with a Layer of a Thermally Activatable Laminating Material Deposited Thereon 2.1. Coextrustion of Polymeric Second Flexible Substrate, Sealant Layer and Thermally Activatable Laminating Material Coextruded 3-ply or more films of a second flexible substrate, a sealant layer and a thermally activatable laminating material were produced using 3 extruders (A, B and C) of Dr Collin type CMG 5.2-4. The 3-ply films produced contained a second flexible substrate (extruder B) disposed between a sealant layer (extruder C) and a thermally activatable laminating material (extruder A). The composition of each of the layer of each of the coextruded 3-ply films is shown in table 2 below. Flexible packaging materials obtained using a coextruded film obtained according to this method are referred to as being produced using a procedure in which deposition of TALM onto the second flexible substrate is by co-extrusion with second flexible substrate in Table 5 below.

TABLE 1

Operating parameters for Dr. Collin type extruders

| Paramter | Value |
| --- | --- |
| Extruder A temp (° C.) | 170-230 |
| Extruder B temp (° C.) | 190-230 |
| Extruder C temp (° C.) | 200-230 |
| Corona Treatment (W) | 200-350 |
| Speed (m/min) | 5-10 |

TABLE 2

Coextruded 3-ply films

| Coextruded 3-ply film | Thermally activatable laminating material (TALM) | Polymeric Second flexible substrate material | Sealant layer material |
| --- | --- | --- | --- |
| 1 | Lotyrl 29MA03 | 60% Hostalen GD 9550F HDPE, 40% Enable 20-10 CB-metalocene LDPE | 60% Hostalen GD 9550F HDPE, 35% Enable 20-10 CB-metalocene LDPE, 5% PB F 15 |
| 2 | 70% Lotyrl 29MA03, 18% Hostalen GD 9550F HDPE, 12% Enable 20-10 CB-metalocen LDPE | 60% Hostalen GD 9550F HDPE, 40% Enable 20-10 CB-metalocene LDPE | 60% Hostalen GD 9550F HDPE, 35% Enable 20-10 CB-metalocene LDPE, 5% PB F 15 |

TABLE 2-continued

Coextruded 3-ply films

| Coextruded 3-ply film | Thermally activatable laminating material (TALM) | Polymeric Second flexible substrate material | Sealant layer material |
|---|---|---|---|
| 3 | Lotyrl 29MA03 | PP-Moplen 2152 | 60% PP-Moplen 2152, 35% RB 501 BF, 5% PB F 15 |
| 4 | 70% Lotyrl 29MA03, 30 % RB501BF | PP-Moplen 2152 | 60% PP-Moplen 2152, 35% RB 501 BF, 5% PB F 15 |
| 5 | Lotyrl 29MA03 | 60% Hostalen GD 9550F HDPE, 40% Enable 20-10 CB-metalocene LDPE | 60% Hostalen GD 9550F HDPE, 35% Enable 20-10 CB-metalocene LDPE, 5% PB F 15 |
| 6 | Tafmer MA9015 | 60% Hostalen GD 9550F HDPE, 40% Enable 20-10 CB-metalocen LDPE | 60% Hostalen GD 9550F HDPE, 35% Enable 20-10 CB-metalocen LDPE, 5% PB F 15 |
| 7 | 70% Tafmer MA9015, 18% Hostalen GD 9550F HDPE, 12% Enable 20-10 CB-metalocen LDPE | 60% Hostalen GD 9550F HDPE, 40% Enable 20-10 CB-metalocen LDPE | 60% Hostalen GD 9550F HDPE, 35% Enable 20-10 CB-metalocen LDPE, 5% PB F 15 |
| 8 | 30% Tafmer MA9015, 40% Hostalen GD 9550F HDPE, 30% Enable 20-10 CB-metalocen LDPE | 60% Hostalen GD 9550F HDPE, 40% Enable 20-10 CB-metalocen LDPE | 60% Hostalen GD 9550F HDPE, 35% Enable 20-10 CB-metalocen LDPE, 5 % PB F 15 |
| 9 | Tafmer MA9015 | PP-Moplen 2152 | 60% PP-Moplen 2152, 35% RB501BF, 5% PB F 15 |
| 10 | 70% Tafmer MA9015, 30% RB501BF | PP-Moplen 2152 | 60% PP-Moplen 2152, 35% RB501BF, 5% PB F 15 |
| 11 | 30% Tafmer MA9015, 70% RB501BF | PP-Moplen 2152 | 60% PP-Moplen 2152, 35% RB501BF, 5% PB F 15 |

The coextruded 3-ply films produced were PE or PP films with atop ply of "thermally activatable laminating material". The thickness of the TALM layer was 20 μm, the thickness of the polymeric second flexible substrate was 50 μm and the thickness of the sealant layer was 20 μm.

2.2. Gravure Coating Layer of Thermally Activatable Laminating Material onto First or Second Flexible Substrate Printed first flexible substrates (as described above) and second flexible substrates (as described above) were coated with a TALM (HME-118B as described above) or Mica HME-160 to provide a layer of TALM having a thickness of 2-12 μm using a laminating machine (LaboCombi 400 from Nordmeccanica—oven temperatures 70° C., 85° C., 105° C.—Anilox 60—Corona Tr, 1 kW on first unwinder, 1.5 kW on rewinder) at a speed of 5-150 m/min.

Flexible packaging materials obtained using gravure coating procedure to apply the thermally activatable laminating material onto the first or second flexible substrate using this method are referred to as being produced using a procedure in which deposition of TALM onto the first or second flexible substrate is by "gravure coating" in Table 5 below.

2.3. Extrusion Coating of Thermally Activatable Laminating Material (TALM) onto Second Flexible Substrate Second flexible substrates were extrusion coated with a TALM using an extruder coating machine as described above.

The second flexible substrate was loaded onto the main unwinder, and the desired thermally activatable laminating material was loaded into the extruder, and the apparatus operated according to the parameters set out in Table 3 below.

Flexible packaging materials obtained using an extrusion coating procedure to apply the thermally activatable laminating material onto the first or second flexible substrate using this method are referred to as being produced using a procedure in which deposition of TALM onto the first or second flexible substrate is by "extrusion coating" in Table 5 below.

TABLE 3

| Parameter | Value |
|---|---|
| Temperature (° C.) | 180-230 |
| Adapter Temperature (° C.) | 210 |
| Dead/die temperature (° C.) | 230 |
| Speed (m/min) | 100-140 |
| Corona tr. 1$^{st}$ unwinder (kW) | 1 |
| Corona tr. final rewinder (kW) | 2-4 |

The second flexible substrates coated with a layer of a TALM had the compositions set out in Table 4 below.

TABLE 4

| Second flexible substrates extrusion coated with TALM | Second flexible substrate | TALM (μm) |
|---|---|---|
| 1 | Al/BOPA/PP (7 μm/15 μm/70 μm) | Lotryl 29MA03 |
| 2 | Al/BOPA/PP (7 μm/15 μm/70 μm) | 70% Lotryl 29MA03, 18% Hostalen GD 9550F HDPE, |

TABLE 4-continued

| Second flexible substrates extrusion coated with TALM | Second flexible substrate | TALM (μm) |
|---|---|---|
| 3 | PET-AlOx/BOPA/PP (12 μm/15 μm/70 μm) | 12% Enable 20-10 CB-metalocen LDPE Lotryl 29MA03 |
| 4 | PET-AlOx/BOPA/PP (12 μm/15 μm/70 μm) | 70% Lotryl 29MA03, 30% RB501BF |
| 5 | Al/BOPA/PP (7 μm/15 μm/70 μm) | Tafmer MA9015 |
| 6 | Al/BOPA/PP (7 μm/15 μm/70 μm) | 70% Tafmer MA9015, 18% Hostalen GD 9550F HDPE, 12% Enable 20-10 CB-metalocen LDPE |
| 7 | MET-BOPP (20 μm) | Tafmer MA9015 |
| 8 | MET-BOPP (20 μm) | 70% Tafmer MA9015, 30% RB501BF |

3. Lamination of First and Second Flexible Substrates with TALM

In this process the first and second flexibles substrates are laminated together using a laminator machine (LaboCombi 400 from Nordmeccanica) with the layer of TALM disposed between the first and second flexible substrates. The printed first flexible substrate was placed in unwinder A and the second flexible substrate in unwinder B, one of the first or second flexible substrates being coated with a layer of a TALM as described above. The laminator was operated for thermal lamination set up as to have a nip temperature of 95-180° C., nip pressure of 2.5-5 bar, and speed 5-150 m/min to produce flexible packaging materials as set out in Table 5 below.

The laminate performance was verified at zero cure time by measuring the lamination bond strength immediately after the laminated material had cooled to room temperature. Lamination bond strength was measured according to ASTM F0904-98R08 (results are shown in Table 5). The inventors also successfully produced flexible packaging materials using other materials as described herein as the first flexible substrate, second flexible substrate and thermally activatable laminating materials, including mixtures of different thermally activatable laminating materials described herein.

TABLE 5

| First flexible Substrate (thickness μm) | Ink | Printing technology | Second flexible substrate (thickness μm) | TALM (thickness μm) | Procedure for deposition of TALM | Lamination Bond Strength (N/inch) |
|---|---|---|---|---|---|---|
| PET (12) | PVC | Gravure | 60% Hostalen GD 9550F HDPE, 40% Enable 20-10 CB-metalocene LDPE (50) | Lotryl 29MA03 (20) | Co-extruded with second flexible substrate | 6 |
| PET (12) | PVB | Gravure | 60% Hostalen GD 9550F HDPE, 40% Enable 20-10 CB-metalocene LDPE (50) | Lotryl 29MA03 (20) | Co-extruded with second flexible substrate | 5.4 |
| PET (12) | PVB | Flexo | 60% Hostalen GD 9550F HDPE, 40% Enable 20-10 CB-metalocene LDPE (50) | Lotryl 29MA03 (20) | Co-extruded with second flexible substrate | 5.2 |
| PET (12) | PVB | Flexo | 60% Hostalen GD 9550F HDPE, 40% Enable 20-10 CB-metalocene LDPE (50) | 70% Lotyrl 29MA03, 18% Hostalen GD 9550F HDPE, 12% Enable 20-10 CB-metalocen LDPE (20) | Co-extruded with second flexible substrate | 5.1 |
| PET (12) | PVC | Gravure | 60% Hostalen GD 9550F HDPE, 40% Enable 20-10 CB-metalocene LDPE (50) | 70% Lotyrl 29MA03, 18% Hostalen GD 9550F HDPE, 12% Enable 20-10 CB-metalocen LDPE (20) | Co-extruded with second flexible substrate | 5.7 |
| PET (12) | PVB | Gravure | PP-Moplen 2152 (50) | Lotryl 29MA03 (20) | Co-extruded with second flexible substrate | 5.7 |
| PET (12) | PVC | Gravure | PP-Moplen 2152 (50) | Lotryl 29MA03 (20) | Co-extruded with second flexible substrate | 6.7 |
| PET (12) | PVB | Flexo | 60% Hostalen GD 9550F HDPE, 40% Enable 20-10 CB-metalocene LDPE (50) | Tafmer MA9015 (20) | Co-extruded with second flexible substrate | 4.7 |
| PET (12) | PU | Gravure | 60% Hostalen GD 9550F HDPE, 40% Enable 20-10 CB-metalocene LDPE (50) | Tafmer MA9015 (20) | Co-extruded with second flexible substrate | 5.3 |
| PET (12) | PU | Gravure | PP-Moplen 2152 (50) | Tafmer MA9015 (20) | Co-extruded with second flexible substrate | 6.4 |
| PET (12) | PU | Flexo | PP-Moplen 2152 (50) | Tafmer MA9015 (20) | Co-extruded with second flexible substrate | 5.5 |
| PET (12) | PCV | Gravure | PP-Moplen 2152 (50) | 30% Tafmer MA9015, 70% RB501BF (20) | Co-extruded with second flexible substrate | 5.9 |
| PET (12) | PVB | Flexo | PP-Moplen 2152 (50) | Lotryl 17BA04 (20) | Co-extruded with second flexible substrate | 7.2 |
| PET (12) | PU | Gravure | 60% Hostalen GD 9550F HDPE, 40% Enable 20-10 CB-metalocene LDPE (50) | Lotryl 17BA04 (20) | Co-extruded with second flexible substrate | 6.7 |
| BOPP (20) | PU | Flexo | 60% Hostalen GD 9550F HDPE, 40% Enable 20-10 CB-metalocene LDPE (50) | Lotryl 24MA02 (20) | Co-extruded with second flexible substrate | 7 |

TABLE 5-continued

| First flexible Substrate (thickness μm) | Ink | Printing technology | Second flexible substrate (thickness μm) | TALM (thickness μm) | Procedure for deposition of TALM | Lamination Bond Strength (N/inch) |
|---|---|---|---|---|---|---|
| BOPP (20) | PVB | Flexo | 60% Hostalen GD 9550F HDPE, 40% Enable 20-10 CB-metalocene LDPE (50) | Lotryl 17BA04 | Co-extruded with second flexible substrate | 7.3 |
| BOPP (20) | PU | Flexo | 60% Hostalen GD 9550F HDPE, 40% Enable 20-10 CB-metalocene LDPE (50) | Lotyrl 29MA03 (20) | Co-extruded with second flexible substrate | 8.5 |
| BOPP (20) | PU | Flexo | 60% Hostalen GD 9550F HDPE,40% Enable 20-10 CB-metalocene LDPE (50) | Tafmer MA9015 (20) | Co-extruded with second flexible substrate | 7.4 |
| PET/PE (12/70) | PU | Gravure | PET (12) | Lotryl 17BA04 | Co-extruded with second flexible substrate | 5.3 |
| PET-AlOx/PP (12/70) | PU | Gravure | PET (12) | Lotryl 17BA04 | Extrusion coating | 4.8 |
| PET-SiOx-PP (12/70) | PU | Flexo | PET (12) | Lotryl 17BA04 | Extrusion coating | 6.6 |
| PET-AlOx/PP (12/70) | PU | Flexo | PET (12) | Lotryl 17BA04 | Extrusion coating | 7 |
| MET-BOPP (20) | PVB | Flexo | BOPP (20) | Lotryl 24MA02 (12) | Extrusion coating | 5.5 |
| PET (12) | PVC | Gravure | Al/BOPA/PP (7/15/70) | Lotryl 29MA03 (14) | Extrusion coating | 6 |
| PET (12) | PVB | Gravure | Al/BOPA/PP (7/15/70) | Lotryl 29MA03 (14) | Extrusion coating | 5.8 |
| PET (12) | PVC | Gravure | Al/BOPA/PP (7/15/70) | Tafmer MA9015 (14) | Extrusion coating | 5.9 |
| PET (12) | PVB | Flexo | PET-AlOx/BOPA/PP (12/15/70) | Lotryl 29MA03 (14) | Extrusion coating | 5.1 |
| PET (12) | PVC | Gravure | PET-AlOx/BOPA/PP (12/15/70) | Lotryl 24MA02 (16) | Extrusion coating | 6.6 |
| PET (12) | PVB | Gravure | MET-BOPP (20) | Lotryl 24MA02 (16) | Co-extruded with second flexible substrate | 5.6 |
| PET (12) | PVC | Flexo | Coextruded 3 ply PE (64) | Lotryl 24MA02 (16) | Co-extruded with second flexible substrate | 6.8 |
| PET (12) | PVB | Flexo | Coextruded 3 ply PE (64) | Lotryl 24MA02 (16) | Co-extruded with second flexible substrate | 4.1 |
| PET (12) | PU | Flexo | Coextruded 3 ply PE (64) | Lotryl 24MA02 (16) | Co-extruded with second flexible substrate | 5.5 |
| PET (12) | PVC | Flexo | Coextruded 3 ply PE (64) | Lotryl 17BA04 | Co-extruded with second flexible substrate | 6.3 |
| PET (12) | PVC | Gravure | Coextruded 3 ply PE (64) | Mica HME-160 | Gravure coating | 4 |
| PET (12) | PVB | Gravure | Coextruded 3 ply PE (64) | Mica HME-160 | Gravure coating | 5 |
| PET (12) | PVB | Flexo | Coextruded 3 ply PE (64) | Mica HME-118B | Gravure coating | 3.7 |
| PET (12) | PVC | Gravure | PET/PE (12/70) | Mica HME-160 | Gravure coating | 4.7 |
| PET (12) | PVB | Gravure | PET/PE (12/70) | Mica HME-160 | Gravure coating | 6 |
| PET (12) | PVC | Flexo | PET/PE (12/70) | Mica HME-118B | Gravure coating | 3 |
| PET (12) | PVB | Flexo | PET/PE (12/70) | Mica HME-118B | Gravure coating | 4 |
| PET/PE (12/70) | PVC | Gravure | PET (12) | Mica HME-118B | Gravure coating | 5.8 |
| MET-BOPP (20) | PVB | Gravure | PET (12) | Mica HME-160 | Gravure coating | 5.9 |
| PET-AlOx/PP (12/70) | PVC | Gravure | PET (12) | Mica HME-118B | Gravure coating | 5.5 |
| PET-AlOx/PP (12/70) | PVB | Flexo | PET (12) | Mica HME-160 | Gravure coating | 3.9 |
| PET (12) | PVC | Gravure | PET (12) | Mica HME-118B | Gravure coating | 3.4 |
| BOPP (20) | PVB | Gravure | MET-BOPP (20) | Mica HME-160 | Gravure coating | 3 |

While the materials, methods and related aspects have been described with reference to certain examples, it will be appreciated that various modifications, changes, omissions, and substitutions can be made without departing from the spirit of the disclosure. The features of any dependent claim may be combined with the features of any of the other dependent claims or any and/or any of the independent claims.

The invention claimed is:

1. A process for preparing a flexible packaging material, the process comprising:
   providing a first flexible substrate having:
      a first surface on which an ink composition is printed, and not reverse printed, to form an image or information, the printed ink composition comprising an ink resin comprising polyvinyl chloride, polyvinyl butyral, nitrocellulose, polyurethane, polyamide or a UV curable resin; and
      a second surface opposed to the first surface and having a sealant layer thereon;
   providing a second flexible substrate that is transparent;
   depositing a layer of thermally activatable laminating material onto one of a first surface of the second flexible substrate or the first surface of the first flexible substrate on which the ink composition is printed, the thermally activatable laminating material comprising a thermally activatable polymer selected from a copolymer of an alkylene monomer and an acrylic acid or methacrylic acid monomer, a copolymer of an alkylene monomer and an alkyl acrylate or alkyl methacrylate monomer, a polyurethane, an ionomer, a copolymer of alkylene monomers, a maleic anhydride modified polyalkylene and an acid modified polyolefin; and
   contacting, under conditions of heat and/or pressure, the layer of thermally activatable laminating material with the other of the first surface of the second flexible substrate or the first surface of the first flexible substrate on which the ink composition is printed so that the sealant layer is disposed at an innermost surface of flexible packaging material and the second flexible substrate is disposed at an outermost surface of the flexible packaging material so the image or information is viewable through the second flexible substrate.

2. The process of claim 1, wherein the first flexible substrate comprises a metallic foil, a metallized substrate or a paper substrate.

3. The process of claim 1, wherein the second flexible substrate comprises a film of biaxially orientated polypropylene or poly(ethylene) terephthalate.

4. The process of claim 1, wherein the thermally activatable laminating layer is contacted at a temperature in the range of about 60° C. to 170° C.

5. The process of claim 1, wherein depositing the layer of thermally activatable laminating material onto the first surface of the second flexible substrate or the first surface of the first flexible substrate comprises extruding a thermally activatable laminating material onto the first surface of the second flexible substrate or the first surface of the first flexible substrate.

6. The process of claim 1, wherein depositing the layer of thermally activatable laminating material onto the first surface of the second flexible substrate or the first surface of the first flexible substrate comprises coating a water-based dispersion or a solvent-based dispersion of a thermally activatable laminating material onto the first surface of the second flexible substrate or the first surface of the first flexible substrate.

7. The process of claim 1, wherein the second flexible substrate is a polymeric second flexible substrate and a layer of thermally activatable laminating material is deposited onto the polymeric second flexible substrate by co-extruding a polymeric second flexible substrate with a thermally activatable laminating material to form a layer of a thermally activatable laminating material disposed on a polymeric second flexible substrate.

8. A flexible packaging material comprising:
a first flexible substrate having a first surface and a second surface opposed to the first surface;
an ink composition printed, and not reverse printed, on the first surface of the first flexible substrate to form an image or information, the printed ink composition comprising an ink resin comprising polyvinyl chloride, polyvinyl butyral, nitrocellulose, polyurethane, polyamide or a UV cured polymer;
a sealant layer on the second surface of the first flexible substrate, the sealant layer being disposed at an innermost surface of flexible packaging material;
a second flexible substrate that is transparent and disposed at an outermost surface of the flexible packaging material so the image or information is viewable through the second flexible substrate; and
a layer of a thermally activated laminating material disposed between and bonded to the second flexible substrate and to the first surface of the first flexible substrate printed with the ink composition, the thermally activated laminating material comprising a thermally activated polymer selected from a copolymer of an alkylene monomer and an acrylic acid or methacrylic acid monomer, a copolymer of an alkylene monomer and an alkyl acrylate or alkyl methacrylate monomer, a polyurethane, an ionomer, a copolymer of alkylene monomers, a maleic anhydride modified polyalkylene and an acid modified polyolefin.

9. The material according to claim 8, wherein the second flexible substrate comprises a thermoplastic polymer.

10. A flexible packaging material comprising:
a first flexible substrate having a first surface and a second surface opposed to the first surface, wherein the first flexible substrate comprises a metallic foil, a metallized substrate or a paper substrate;
an ink composition printed on the first surface of the first flexible substrate, the printed ink composition comprising an ink resin comprising polyvinyl chloride, polyvinyl butyral, nitrocellulose, polyurethane, polyamide or a UV cured polymer;
a sealant layer on the second surface of the first flexible substrate, the sealant layer being disposed at an innermost surface of flexible packaging material;
a second flexible substrate disposed at an outermost surface of the flexible packaging material, the second flexible substrate being transparent; and
a layer of a thermally activated laminating material disposed between and bonded to the second flexible substrate and to the first surface of the first flexible substrate printed with the ink composition, the thermally activated laminating material comprising a thermally activated polymer selected from a copolymer of an alkylene monomer and an acrylic acid or methacrylic acid monomer, a copolymer of an alkylene monomer and an alkyl acrylate or alkyl methacrylate monomer, a polyurethane, an ionomer, a copolymer of alkylene monomers, a maleic anhydride modified polyalkylene and an acid modified polyolefin.

11. A flexible package comprising
a flexible material comprising:
a first flexible substrate having a first surface and a second surface opposed to the first surface, wherein the first flexible substrate comprises a metallic foil, a metallized substrate or a paper substrate;
an ink composition printed, and not reverse printed, on the first surface of the first flexible substrate to form an image or information, the printed ink composition comprising an ink resin comprising polyvinyl chloride, polyvinyl butyral, nitrocellulose, polyurethane, polyamide or a UV cured polymer;
a sealant layer on the second surface of the first flexible substrate, the sealant layer being disposed at an innermost surface of flexible material;
a second flexible substrate that is transparent and disposed at an outermost surface of the flexible material so the image or information is viewable through the second flexible substrate; and
a layer of a thermally activated laminating material disposed between and bonded to the second flexible substrate and to the first surface of the first flexible substrate printed with the ink composition, the thermally activated laminating material comprising a thermally activated polymer selected from a copolymer of an alkylene monomer and an acrylic acid or methacrylic acid monomer, a copolymer of an alkylene monomer and an alkyl acrylate or alkyl methacrylate monomer, a polyurethane, an ionomer, a copolymer of alkylene monomers, a maleic anhydride modified polyalkylene and an acid modified polyolefin;
wherein sections of the flexible material are sealed together at the sealant layer to form an interior of the flexible package.

12. The material according to claim 8, wherein the sealant layer is a film of thermoplastic material having a melting point in a range of from about 60° C. to about 120° C.

13. The material according to claim 8, wherein the sealant layer is a copolymer of an alkylene monomer and an acrylic acid or methacrylic acid monomer, a copolymer of an alkylene monomer and an alkyl acrylate or alkyl methacrylate monomer, a polyurethane, a copolymer of alkylene monomers, a maleic anhydride modified polyalkylene, or an acid modified polyolefin.

* * * * *